(12) United States Patent
Politano (10) Patent No.: US 7,792,740 B1
(45) Date of Patent: Sep. 7, 2010

(54) CONSUMPTION INVESTMENT SYSTEM

(75) Inventor: Frank L. Politano, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1643 days.

(21) Appl. No.: 09/883,384

(22) Filed: Jun. 19, 2001

(51) Int. Cl.
*G06Q 40/00* (2006.01)
(52) U.S. Cl. .................. 705/38; 705/35; 705/36 R; 705/39; 705/40; 708/134
(58) Field of Classification Search ............. 705/35–39, 705/40; 708/134
See application file for complete search history.

(56) References Cited

U.S. PATENT DOCUMENTS

| | | | | |
|---|---|---|---|---|
| 3,634,669 | A * | 1/1972 | Soumas et al. ............ | 705/36 R |
| 5,787,404 | A * | 7/1998 | Fernandez-Holmann ..... | 705/35 |
| 5,923,016 | A * | 7/1999 | Fredregill et al. ........... | 235/380 |
| 6,631,358 | B1 * | 10/2003 | Ogilvie ........................ | 705/39 |
| 2002/0198803 | A1 * | 12/2002 | Rowe ........................... | 705/35 |

OTHER PUBLICATIONS

Jennifer Kingson Bloom, "New B of A Card Offers Discounts on Bank Products." American Banker. New York, N.Y.: Dec. 1, 1997. col. 162, Iss. 229: p. 23 (3 pages).*
Charles A. Jaffe "Shop 'n' save—or save 'n' shop?"; Seattle Times, Seattle, Wash, Feb. 21, 2000. p. C2.*

* cited by examiner

*Primary Examiner*—Harish T Dass (57) ABSTRACT

A consumption investment system permits consumers to deposit value corresponding to their consumables in an investment consumable account as principal, and accrue benefits based on the principal. As with a bank account, the accrued benefits may be based on an interest rate or market valuations, and the consumer may withdraw the accrued benefits based on terms of a contract. Many types of consumable investment instruments may be used much like other types of investments. For example, mutual consumable funds may be established where values of consumables of many participants are pooled, and participants may receive benefits based on corresponding contributions. Consumers that invest in a particular fund (or other consumable investment such as a bank consumable account) may build natural interest and loyalty to the particular fund such as occurs with financial mutual funds. In this way, consumer loyalty may be engendered toward suppliers of consumable items based on capital already invested in the suppliers by way of consumable accounts such as consumable deposits or mutual consumable funds.

20 Claims, 6 Drawing Sheets

CONSUMPTION INVESTMENT SYSTEM

BACKGROUND OF THE INVENTION

1. Field of Invention

This invention relates to a consumption investment system.

2. Description of Related Art

There are many reward incentive systems/techniques that attract consumers to purchase goods and services. For example, "buy one and get one free" is a common technique used to attract consumers for immediate purchases; and the offer of "frequent flyer miles" is used to attract many consumers to purchase airplane tickets from a specific airline. Newer techniques are needed to achieve other qualities of consumer response to further businesses' goals.

SUMMARY OF THE INVENTION

This invention provides a consumption investment system that permits consumers to deposit value corresponding to their consumables in an investment consumable account as principal, and accrue benefits based on the principal. A consumable may be one or more purchased items such as gasoline or groceries, or services such as lawn care or telecommunication services, for example. When a consumable is purchased, the value corresponding to that consumable may be deposited much like money in a bank savings account with the exception that the principal is value of already consumed items or services as opposed to currency which is power for future consumption. Thus, while the principal may not be consumed again, benefits such as interest may accrue and be withdrawn.

As with a bank account, the accrued benefits may be based on an interest rate or market valuations, and the consumer may withdraw the accrued benefits based on terms of a contract. For example, if a consumable account agreement sets an accrual rate of 5% per year for telecommunications services that are consumed over a three year period (i.e., a three year certificate of consumable deposit), then, similar to a certificate of deposit, corresponding values of the consumed telecommunication services over the three year period may be deposited as the principal. The principal then accrues benefits based on the 5% accrual rate. Thus, if $5,000 of telecommunication services were consumed for each of the three years, then the accrued benefit for each year may be $250, if the interest is determined at the end of each respective year without accounting for when the principal was deposited during the year. Thus, after three years, the consumer may withdraw $750 worth of telecommunication service value in long-distance minutes, for example. The $750 may be applied to further consumption as may be specified by the consumable account agreement.

Other types of consumable investment instruments may also be applied much like other types of investments. For example, mutual consumable funds may be established where values of consumables of many participants are pooled, and participants may receive benefits based on corresponding contributions. In addition, the accrual rate may be related to market values of the consumed services instead of a fixed or variable interest rates, for example.

Consumers that invest in a particular fund (or other consumable investment such as a bank consumable account) may build natural interest and loyalty to the particular fund such as occurs with financial mutual funds. If mutual consumable funds are structured around products of a single supplier or a group of suppliers, then the participating consumers would more likely continue to purchase consumables from these suppliers. In this way, consumer loyalty may be engendered toward suppliers of consumable items based on capital already invested in the suppliers by way of consumable accounts such as consumable deposits or mutual consumable funds.

BRIEF DESCRIPTION OF THE DRAWINGS

The invention will be described, with reference to the following figures, wherein like numerals represent like elements, and wherein.

DETAILED DESCRIPTION OF PREFERRED EMBODIMENTS

Figure 1:
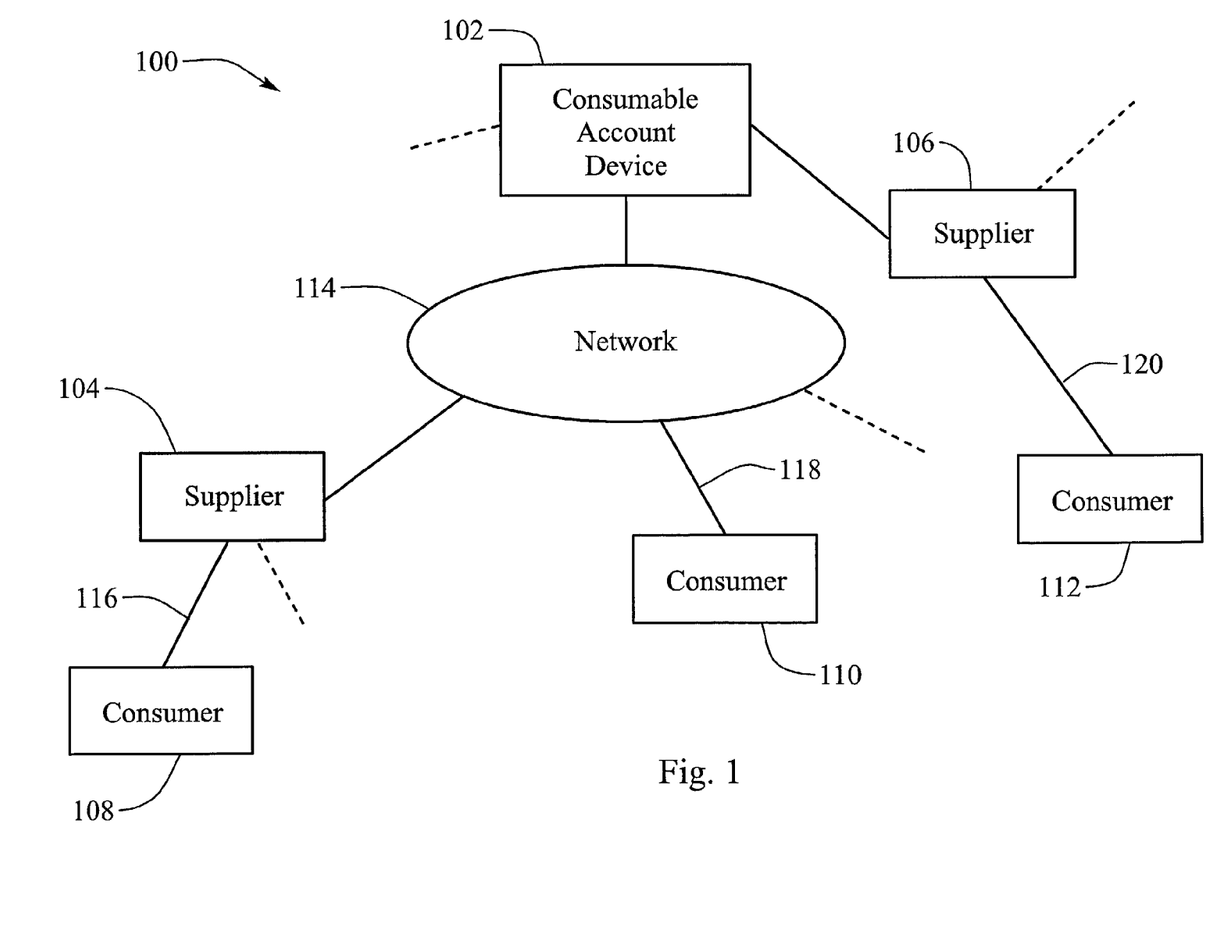
FIG. 1 is a diagram of an exemplary consumption investment system.

FIG. 1 shows an exemplary consumable investment system 100 that includes a consumable account device 102, suppliers 104 and 106, consumers 108-112, and a network 114. The network 114 may be a data network, a telephone switching network, etc.; the suppliers 104 and 106 may be retailers, manufacturers, service providers, etc.; and the consumers 108-112 may be individuals or businesses that use products and services provided by the suppliers 104 and 106, for example.

The consumable investment system 100 provides an ability for the consumers 108-112 to take advantage of their past consumption of an item to leverage benefits for future consumption. The item may be any purchasable objects or services. For example, the consumer 108 may purchase food from a grocery store that is a subscriber to the consumable investment system 100. The value corresponding to the purchased groceries may be deposited in an account as principal for the consumer 108. After some period of time, the account may yield interest based on the deposited principal in the form of purchasing power at the same grocery store, for example. (Purchasing power also may be for other suppliers 104-106.) The consumer 108 may withdraw the "earned" purchasing power (earned value) by making additional purchases up to a value of the earned value.

Similarly, if the "item" is a service such as a wireless telecommunication service from a telecommunication service provider, the consumer 110 may accumulate principal in an account by making cell phone calls, for example. If an agreement between the consumer 110 and the telecommunication service provider specifies a 5% interest rate per year compounded yearly for call time consumed over a period of three years, then, after a three year period making $1000 worth of cell phone calls per year, the consumer 110 may have earned $300 for future cell phone calls (($1000*0.05)+($2000*0.05)+($3000*0.05)).

Agreements between consumers 108-112 and the suppliers 104-106 (or other consumable investment providers) may be drafted to achieve various business goals. For example, if long term consumer loyalty to a particular supplier is desired, then the period of the investment may be set longer before withdraw of the earned value is permitted. On the other hand, if the agreement is to encourage consumers 108-112 to consume a new item during its introduction, for example, a shorter period may be set so that more immediate gratification may be provided. Other parameters may be specified or adjusted in the agreement such as the interest rate or ability to move the principal between accounts, the ability to merge/split accounts, the ability to have joint accounts, or mutual accounts corresponding to mutual funds, and so on.

As shown in FIG. 1, connections between the suppliers 104-106, the consumers 108-112, the consumable account device 102 and the network 114 may have a wide variety of configurations. Depending on the type of business (e.g., retailer, manufacturer, service provider, etc.), the supplier-consumer relationship may take on very different forms relative to the consumable investment system 100. For example, if the supplier is a retail organization (groceries, hardware stores, department stores, etc.), then the supplier 104-106 may issue customer cards, for example. Every time a consumer 108-112 enters a store of the supplier 104-106 and purchases items, the customer card may be used to identify an account of that consumer 108-112 so that the purchase amount may be deposited into the account as principal. If the supplier 104-106 operates in a network environment such as the Internet, then the logon ID may be used to identify an account for depositing any purchase amount as principal. If the supplier 104-106 is a telecommunications service provider (e.g., telephone company), then charges for the provided service may be deposited in an account during the course of the billing process, for example.

The suppliers 104-106 and the consumable account device 102 may be related in different manners depending on the specific circumstances. For example, the supplier 104 may be connected to the consumable account device 102 via the network 114. In this case, the supplier 104 may make deposits to and withdraws from accounts remotely. The supplier 106 is connected directly to the consumable account device 102, and may communicate with the consumable account device 102 without the network 114 at all.

The consumable account device 102 may be operated by an organization independent from the suppliers 104-106 or may be part of a particular supplier 104-106. For example, a bank may operate the consumable account device 102 and solicit suppliers 104-106 to become subscribers to a consumable investment service. If large enough, for example, a supplier 104-106 may operate its own consumable account device 102 to provide consumable investment features associated with its business. In this case, the consumable investment device 102 may be connected to different sites of the supplier 104-106 via the network 114, for example.

The consumers 108-112 may also interface directly with the consumable investment device 102. For example, the consumer 110 may access the consumable investment device 102 via the network 114 to perform various functions on an account much like a financial investment account, for example. Thus, the consumer 110 may move a portion of the principal to another account, change the period for withdrawal (with agreed upon changes in interest rate, for example), or withdraw earned value (even as cash if so specified in the account agreement), for example. The account may be structured to be as flexible, and to include as many features, as the consumers 108-112 and the suppliers 104-106 (and/or operator of the consumable investment device 102) desire. In this way, long term relationship between suppliers 104-106 (or the consumable account system operator) and consumers 108-112 may be engendered.

Figure 2:
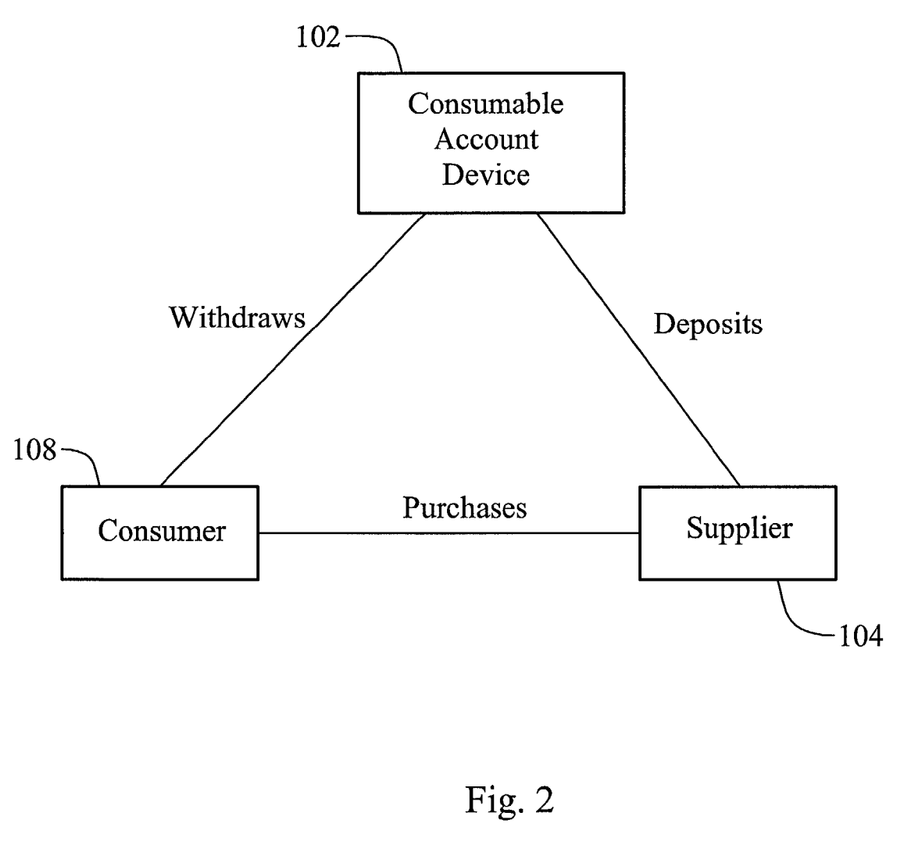
FIG. 2 is a block diagram of an exemplary consumption investment relationship.

FIG. 2 shows an exemplary diagram of the relationship between the consumer 108, the supplier 104, and the consumable account device 102. When the consumer 108 purchases items, the supplier 104 may make a deposit to an account of the consumer 108 in the consumable account device 102. The supplier 104 may make the deposit immediately, on a periodic basis or until a set amount of purchases have been made. In making the deposit, the supplier 104 may provide information relating to the purchases. For example, the supplier 104 may include an identification of the consumer 108 (or an identification of a specific account), a value that corresponds to the purchases to be added to the principal in the account, and any other information depending on the specific circumstances.

The value deposited may relate to the purchases in any desired way. For example, the value may correspond directly to an amount of the purchases, or to a number of times that the consumer 108 visited the supplier 104 (e.g., a number of times the consumer entered a supplier store and made a purchase, a number of calls made, etc.).

The principal may correspond to a value associated with an amount spent during a set period of time. For example, a point may be accumulated for each dollar spent with a specific supplier 104-106. During certain promotion time periods, the supplier 104-106 may double the point-to-dollar value to encourage greater use by existing customers and to attract new customers. Additionally, the principal may be based on a table of values that is associated with certain products or services. For example, a sandwich shop that uses punch outs on a card that gives the consumer a free sandwich after a set number of punch outs may assign a different number of punch outs to different types of sandwiches. Thus, one sandwich may be worth one punch out while another may be worth three, irrespective of price. Other relationships between the amount deposited and the purchase may be established depending on the goals desired to be achieved.

The deposit to an account may be negative when, for example, a penalty is incurred. A consumable account agreement may specify that if the consumer does not purchase a certain amount of items (valued in dollars, for example) for a specified period of time, then the principal would be reduced by a specified amount. In a service business, a penalty may be incurred if service from another supplier is used instead of service from a specified supplier, resulting in a negative deposit being made. In this way, consumers 108-112 may be further encouraged to be loyal to a particular supplier 104-106.

As mentioned above, the consumer 108 may access the consumable account device 102 independently, if desired. The consumer 108 may be provided capabilities such as starting an account, withdrawing earned interest, transferring principal between accounts, adjusting account parameters such as adding or dropping suppliers (if the consumable account device 102 is supplier independent), or adding or dropping items for participation in the consumable investment system 100. For example, if the supplier is a telecommunications service supplier and offers a complete array of services, the consumer 108 may desire to try out a new advertised service and to include the use of the new service as part of the account. Thus, the consumer 108 may be provided a full featured interface to maintain and modify the account.

Figure 3:
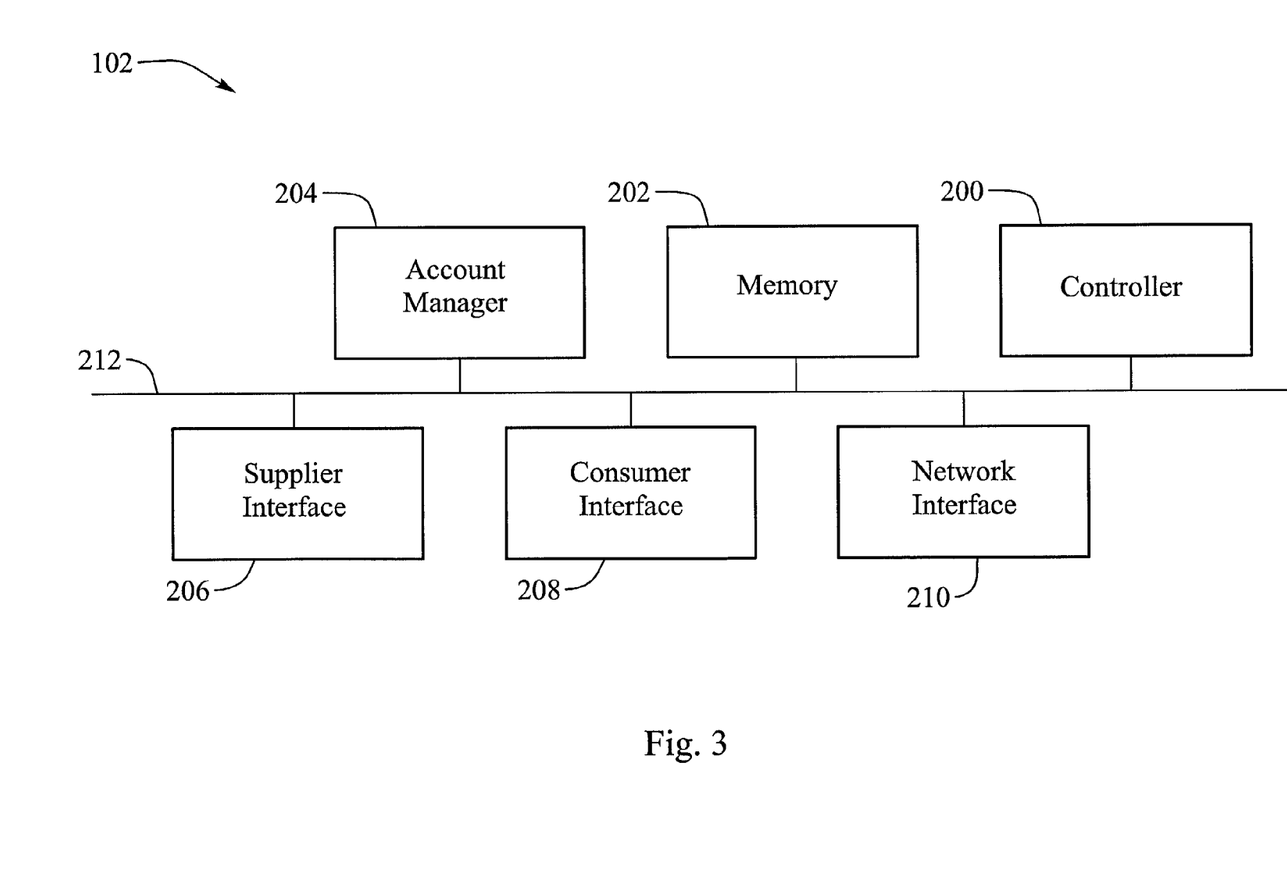
FIG. 3 is a block diagram illustrating an exemplary consumable account device.

FIG. 3 shows a block diagram illustrating an exemplary consumable account device 102 that includes a controller 200, a memory 202 (which may include large databases shared in a variety of memory types such as disks, tapes, RAM, etc.), an account manager 204, a supplier interface 206, a consumer interface 208, and a network interface 210. All the above components may be coupled together by a bus 212. While FIG. 3 shows the consumable account device 102 using a bus architecture, any other type of architecture may be used as is well known to one of ordinary skills in the art.

After a consumer 108-112 purchases an item from a subscribing supplier 104-106, the supplier 104-106 may transmit information relating to the purchase to the consumable account device 102. When the transmitted information is received, the supplier interface 206 accepts the information and forwards it to the controller 200. After initial verification (identify supplier, valid account number, etc.), the controller 200 may command the account manager 204 to process relevant portions of the information.

Similarly, a consumer 108-112 may make a purchase from a supplier who may not be a subscriber to a consumable investment system 100 but may offer products or services whose manufacturers or service providers do provide consumable investment systems 100. In these situations, it may be necessary for the consumer 108-112 to transmit the information relating to the purchase to the consumable account device 102 of an appropriate consumable investment system 100. For example, a small hardware retailer may sell tools by several manufacturers and each tool manufacturer may provide a consumable investment system 100 for its products. The consumer may purchase a set of screwdrivers from one manufacturer and a new power saw from another. However, because the hardware retailer may not be a subscriber to the manufacturers' consumable systems, the consumer 108-112 may transmit the purchase information via the network 114 to both tool manufacturers' consumable account devices 102 for deposit into the respective accounts of the consumer 108-112.

For purchase information transmitted by the consumer 108-112 (e.g., via the network 114 or via mail) to the consumable account device 102, the consumer interface 208 receives the purchase information and forwards it to the controller 200. As with information received from subscribing suppliers 104-106, the controller 200 may perform an initial verification of the purchase information (e.g., consumer identification, account number verification, password, etc.) and may command the account manager 204 to process the appropriate information in the manner described above for information transmitted by subscribing suppliers 104-106.

The suppliers 104-106 may not be subscribers to a consumable investment system 100, but may offer the service of transmitting the consumer 108-112 purchase information to a consumable account device 102. In the hardware retailer example above, the retailer may provide the service of transmitting the consumer's purchase information to the various manufacturers' consumable account devices 102.

Figure 4:
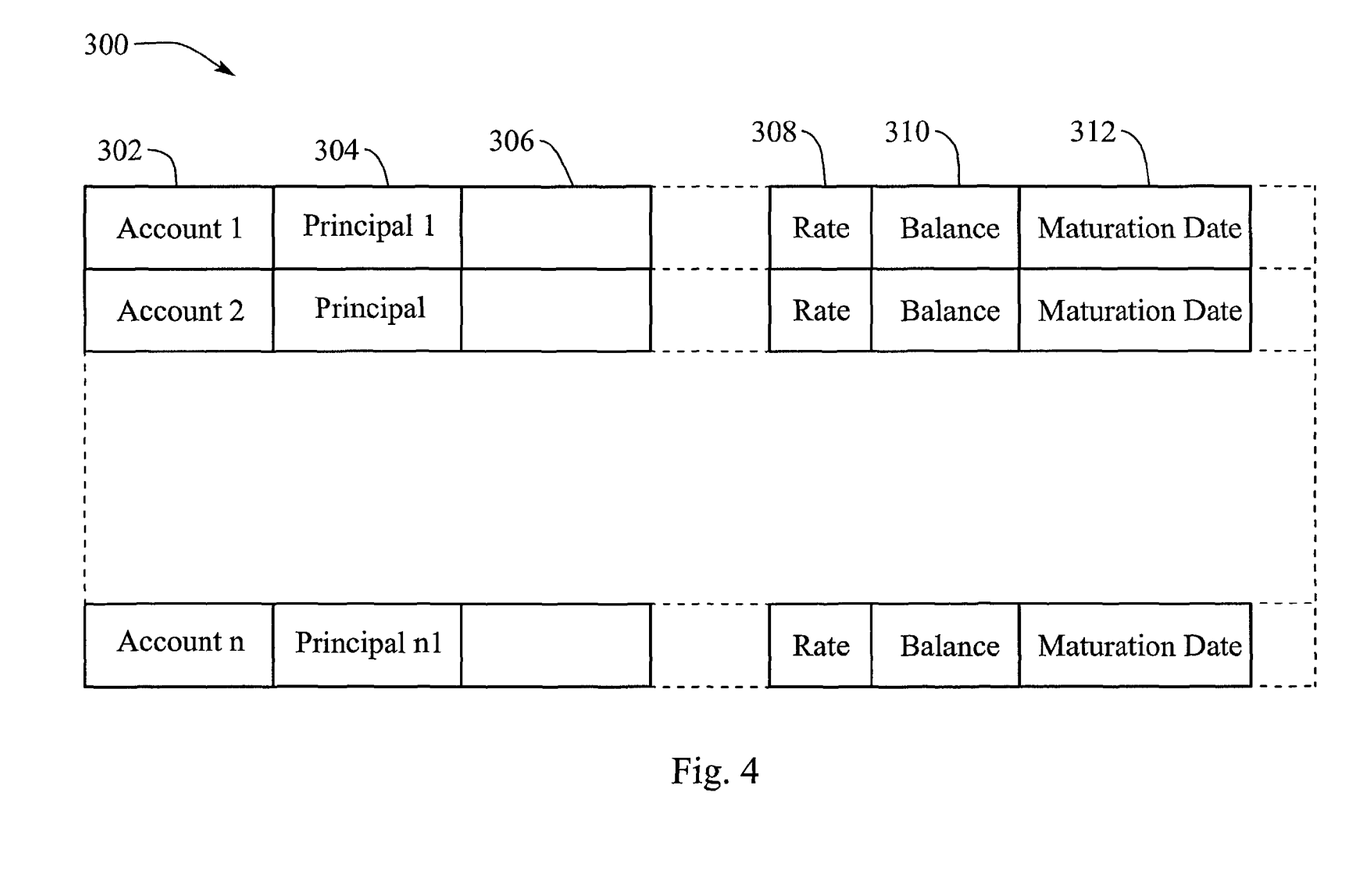
FIG. 4 is a diagram of exemplary consumable accounts.

The account manager 204 may maintain an exemplary database 300 shown in FIG. 4 for each subscribing supplier 104-106 and/or for each subscribing consumer 108-112. The database 300 may include many fields such as fields 302-312 for storing needed information to process a consumer account. The field 302 may be an account ID; the field 304 may be a value of a principal; the field 308 may be an interest rate; the field 310 may be a balance remaining of an earned interest; and the field 312 may indicate the maturation date of the account, for example. Other fields may also be included and some of the fields 302-312 may not be needed as specific implementation circumstances may dictate.

A consumer 108-112 may have one or more accounts with the same supplier 104-106 for different products of the supplier 104-106. For example, the supplier 104-106 may be a telecommunications supplier and offers many different types of services such as a cell phone service, a paging service and an Internet access provider service. A consumer 108-112 of the telecommunication supplier's services may wish to keep a separate account for each of the three offered services where a different interest rate and maturation date may be agreed upon for each type of service.

When the command from the controller 200 is received, the account manager 204 may extract an account ID from the received information and update the principal. For example, if the principal is simply the amount in dollars of purchased items, then the account manager 204 may add new purchased amounts to the principal. If the principal is a number of times the consumer 108-112 visited the supplier 104-106 and made a purchase, then the account manager 204 may increment the principal with this information.

Subscribing suppliers 104-106 and consumers 108-112 may continue to provide purchase information to the account manager 204 for deposit into principals of consumer accounts or as may be agreed to in account agreements. At agreed to time intervals defined by the maturation dates 312 of the accounts 302, for example, earned values for the accounts 302 may be determined by the account manager 204 and (based on principals 304 and the rates 308) may be stored in the balances 310 of the consumer's accounts 302.

The maturation dates 312 and the rates 308 may be set differently for each of accounts 302, depending on respective account agreements. For example, the rate 308 for Account 1 may be 5% while the rate 308 for Account 2 may be 13%. The consumers 108-112 may withdraw the accrued earned value in the balances 310 also based on the account agreements.

When the suppliers 104-106 or the consumers 108-112 initiates contact with the consumable account device 102, either directly or via the network 114, the controller 200 interacts with the supplier 104-106 or consumer 108-112 to assure that the proper consumer account information is accessed by validating a consumer identification, for example. The validation may be accomplished automatically via passwords stored in a consumer card, for example, or conducted interactively with a consumer 108-112. After validating the consumer/supplier identification and determining the nature of the desired transaction, the controller 200 may provide appropriate information extracted from the database 300 to the supplier 104-106 or consumer 108-112. Information may also be provided to the account manager 204 for performing appropriate processes.

For example, if the information received requires a deposit into an account 302, the deposit amount may be forwarded to the account manager 204 to perform the needed process. In addition, the account manager 204 may support other account management activities such as the transfer of principal between accounts, withdrawal of earned value, adjust account parameters such as adding or dropping suppliers, or adding or dropping items for participation in the consumable investment system.

The account manager 204 may process the database 300 on a periodic basis. For example, at the end of each day, the account manager 204 may update each of the accounts 302 to determine accrued earned value, if any, and any processing that may have been required by the suppliers 104-106 or consumers 108-112, but was deferred.

Other types of processing may also be required depending on features that may be offered. For example, consumers 108-112 may be offered checking or earned value cards that permit one consumer 109-112 to transfer earned value or principal to another consumer 108-112. In such circumstances, the account manager 204 may perform check clearing house type processing or "cash card" type processing.

To support the above suggested features, the account manager 204 may be implemented in a distributed manner and may have different portions with specialized functions, much like banks and credit organizations. The account manager 204 may be coupled to the controller 200 over the network 114 and different portions of the account manager 204 may not be in communication with other portions of the account manager 204 due to the functional partitioning of required tasks. In addition, the controller 200 itself may also be distributed as implementation circumstances may dictate.

Figure 5:
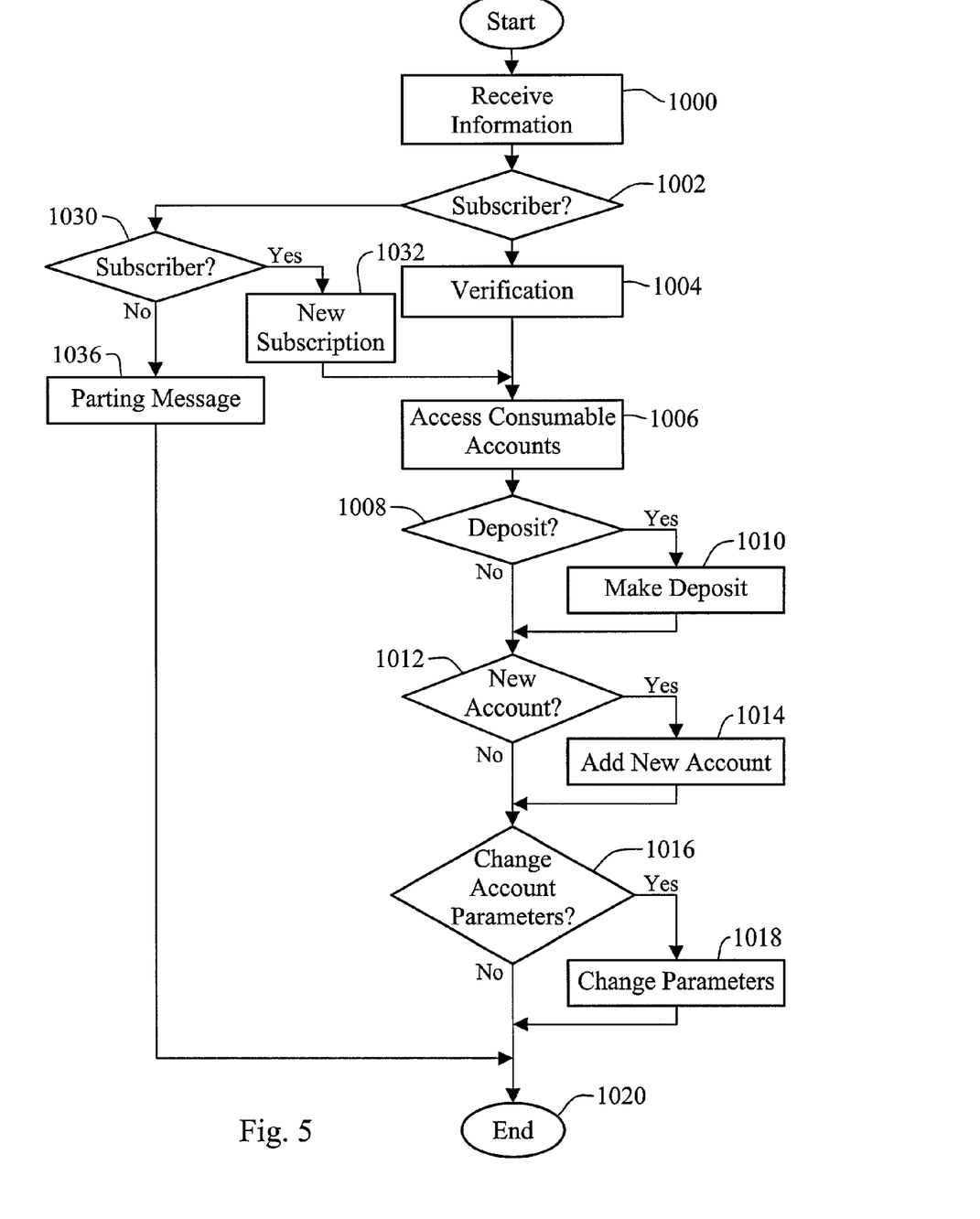
FIG. 5 is a flow diagram of an exemplary process of the consumption investment system for suppliers.

FIG. 5 shows a flowchart of an exemplary process of the controller 200 for interaction with the suppliers 104-106. In step 1000, the controller 200 receives information from the supplier 104-106 and goes to step 1002. In step 1002, the controller 200 determines if the supplier 104-106 is a subscriber. If the supplier 104-106 is a subscriber, the controller 200 goes to step 1004; otherwise, the controller 200 goes to step 1030. In step 1004, the controller 200 performs verification of the supplier, (e.g., password, personal identification number, account number, etc.) and goes to step 1006. In step 1006, the controller 200 accesses the supplier's consumable accounts and goes to step 1008. In step 1008, the controller 200 determines if the supplier 104-106 has purchase information for deposit into consumer accounts. If so, the controller 200 goes to step 1010; otherwise, the controller 200 goes to step 1012. In step 1010, the controller 200 commands the account manager 204 to make the deposits and goes to step 1012.

In step 1012, the controller 200 determines if the supplier 104-106 requests one or more new consumer accounts to be established. If new accounts are to be established, the controller 200 goes to step 1014; otherwise, the controller 200 goes to step 1016. In step 1014, the controller 200 commands the account manager 204 to establish the new accounts based on the information provided by the suppliers 104-106 and goes to step 1016.

In step 1016, the controller 200 determines if the supplier 104-106 requested account parameter changes. If parameter changes are requested, the controller 200 goes to step 1018; otherwise the controller 200 goes to step 1020. In step 1018, the controller 200 changes the account parameters as specified by the supplier 104-106 and goes to step 1020 and ends.

In step 1030, the controller 200 queries whether the supplier 104-106 desires to be a subscriber of the consumable investment system. If the supplier 104-106 desires to subscribe, the controller 200 goes to step 1032; otherwise, the controller 200 goes to step 1036. In step 1036, the controller 200 sends a parting message to the supplier 104-106 and goes step 1020 and ends. In step 1032, the controller 200 commands the account manager 204 to add the supplier 104-106 as a new subscriber and establish requested accounts, and the process goes to step 1006.

Figure 6:
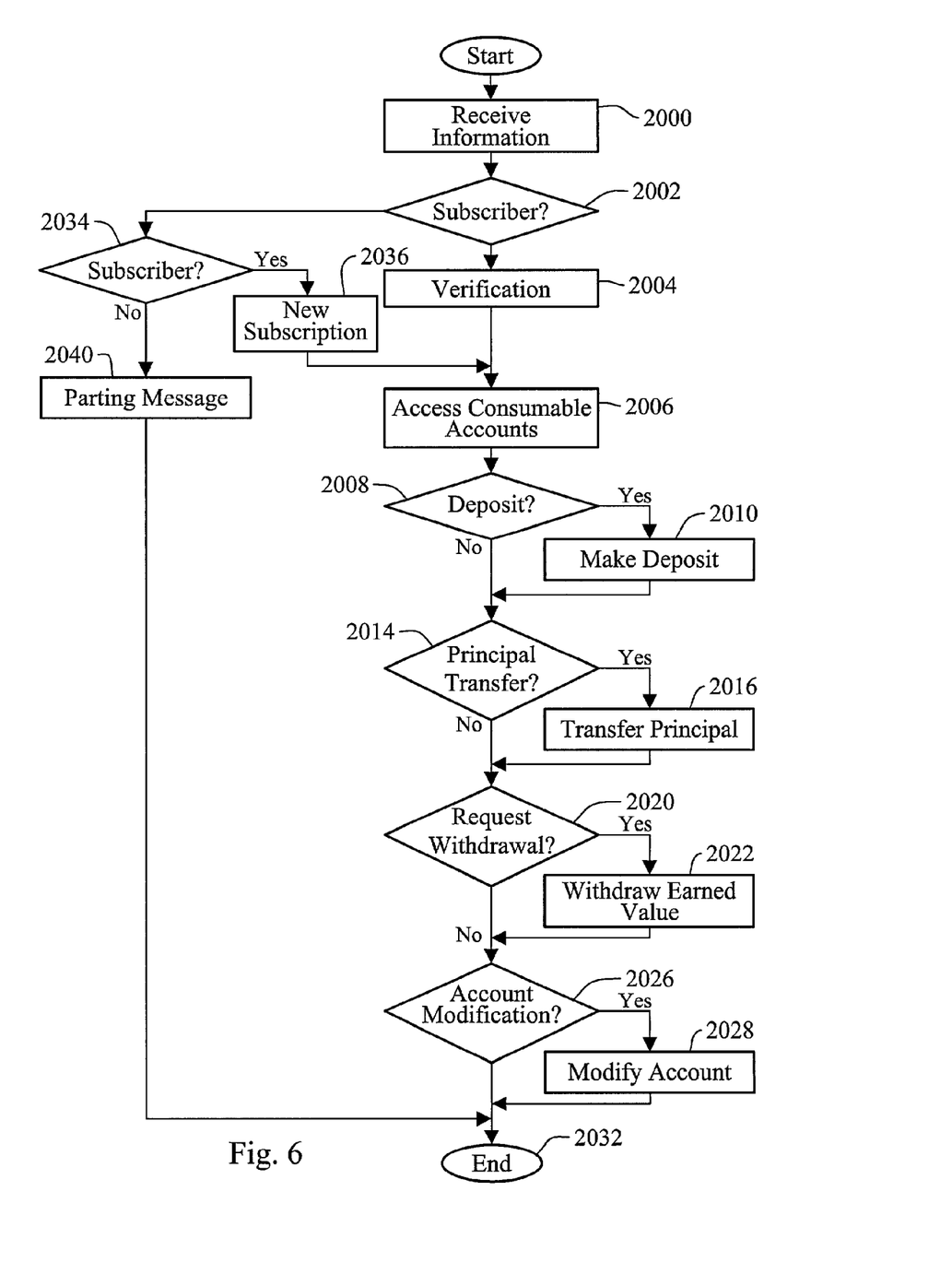
FIG. 6 is a flow diagram of an exemplary process of the consumption investment system for consumers.

FIG. 6. shows a flowchart depicting an exemplary process of the controller 200 for interaction with a consumer 108-112. In step 2000, the controller 200 receives information from the consumer 108-112 and goes to step 2002. In step 2002, the controller 200 determines if the consumer 108-112 is a subscriber. If a subscriber, the controller 200 goes to step 2004; otherwise, the controller 200 goes to step 2034. In step 2004, the controller 200, performs verification of the consumer (e.g., password, etc.) and then goes to step 2006. In step 2006, the controller 200 accesses the appropriate consumer consumable accounts and goes to step 2008.

In step 2008, the controller 200 determines whether the consumer 108-112 has purchase information for deposit into their account. If a deposit is requested, then the controller 200 goes to step 2010; otherwise, the controller 200 goes to step 2014. In step 2010, the controller 200 commands the account manager 204 to deposit the appropriate amount in the consumer account and goes to step 2014.

In step 2014, the controller 200 determines whether a transfer of principal is requested. If a transfer is requested, the controller 200 goes to step 2016; otherwise, the controller 200 goes to step 2020. In step 2016; the controller 200 commands the account manager 204 to open appropriate accounts and perform the requested transfer(s), and the process goes to step 2020.

In step 2020, the controller 200 determines whether the consumer 108-112 requests a withdrawal of earned value. If a withdrawal is requested, then the controller 200 goes to step 2022; otherwise, the controller 200 goes to step 2026. In step 2022, the controller 200 commands the account manager 204 to withdraw the requested earned values and perform the appropriate account processing, and the process goes to step 2026.

In step 2026, the controller 200 determines whether the consumer 108-112 requested an account modification. If an account modification is requested, then the controller 200 goes to step 2028; otherwise, the controller 200 goes to step 2032 where the process ends. In step 2028, the controller 200 commands the account manager 204 make the appropriate modification to the account and goes to step 2032 and ends.

In step 2034, the controller 200 queries whether the consumer 108-112 desires to become a subscriber. If the consumer 108-112 desires to subscribe, the controller 200 goes to step 2036; otherwise, the controller 200 goes to step 2040. In step 2036, the controller 200 commands the account manager 204 to perform new subscription processing for 108-112 the consumer, (e.g., set up a consumer account) and goes to step 2006. In step 2040, the controller 200 outputs a parting message and goes to step 2032 and ends.

While this invention has been described in conjunction with specific embodiments thereof, it is evident that many alternatives, modifications and variations will be apparent to those skilled in the art. Therefore, exemplary embodiments of the invention as set forth herein are intended to be illustrative and not limiting. Various changes may be made without departing from the spirit and scope of the invention.

What is claimed is:

1. A method for operating a consumable investment system, comprising:
   depositing value as principal corresponding to a consumed item of a supplier into a consumable account device comprising a memory and a controller;
   accruing earned value at consumable account device for future consumption of the consumed item based on the principal and an interest rate applied to the principal; and
   prohibiting withdrawal of the principal in the consumable account device for use in further consumption.

2. The method of claim 1, further comprising:
   maintaining an account for a consumer that consumed the consumed item at the consumable account device; and
   permitting withdrawal of the earned value from the consumable account device for future consumption of the consumed item based on terms of an agreement for the account.

3. The method of claim 2, the step of maintaining an account comprising:
   updating the principal based on one or more deposits of consumed items at the consumable account device; and
   generating a balance of accrued earned value at the consumable account device on a schedule based on the agreement.

4. The method of claim 2, the account comprising one or more of:
   a savings consumable account;
   a certificate of consumable deposit; and
   a mutual consumable fund.

5. The method of claim 1, further comprising:
receiving information from one or more suppliers; and
updating consumer accounts at the consumable account device based on the received information.

6. The method of claim 5, the information comprising one or more of:
one or more new interest rates to replace current interest rates for one or more consumer accounts;
one or more new consumer accounts;
one or more maturation dates to replace current maturation dates; and
one or more principals updates to increment or decrement current principals; and
one or more earned values to increment or decrement current earned values.

7. The method of claim 5, the step of updating consumer accounts comprising one or more of:
transferring principal from a consumer account to another consumer account;
withdrawing earned value from a consumer account;
depositing additional value to a consumer account; and
changing parameters of a consumer account.

8. The method of claim 1, the principal comprising one or a combination of two or more of:
value corresponding to consumer items;
a number of times purchases were made;
a number of times a supplier was visited;
a value for consumed items based on a table of values corresponding to items; and
a value corresponding to an amount spent during a period of time.

9. A consumable investment system, comprising:
a memory; and
a controller coupled to the memory, the controller configured to:
store in the memory a value as principal corresponding to a consumed item of a supplier;
store in the memory an earned value for future consumption of the consumed item in the memory based on the principal and an interest rate applied to the principal, and
prohibit withdrawal of the principal for use in further consumption.

10. The system of claim 9, further comprising:
a consumer interface, the controller coupled to the consumer interface maintaining an account for a consumer that consumed the consumed item, and permitting withdrawal of the earned value for future consumption of the consumed item based on terms of an agreement for the account.

11. The system of claim 10, wherein the controller updates the principal based on one or more deposits of consumed items, and generates a balance of accrued earned value on a schedule based on the agreement.

12. The system of claim 10, wherein the account comprises one or more of:
a savings consumable account;
a certificate of consumable deposit; and
a mutual consumable fund.

13. The system of claim 9, further comprising:
a supplier interface coupled to the controller, the controller receiving information from one or more suppliers through the supplier interface and updating consumer accounts based on the received information.

14. The system of claim 13, wherein the information comprises one or more of:
one or more new interest rates to replace current interest rates for one or more consumer accounts;
one or more new consumer accounts;
one or more new maturation dates to replace current maturation dates; and
one or more principals updates to increment or decrement current principals; and
one or more earned values to increment or decrement current earned values.

15. The system of claim 13, wherein the controller updates consumer accounts by one or more of:
transferring principal from a consumer account to another consumer account;
withdrawing earned value from a consumer account;
depositing additional value to a consumer account; and
changing parameters of a consumer account.

16. The system of claim 9, wherein the principal comprises one or a combination of two or more of:
value corresponding to consumer items;
a number of times purchases were made;
a number of times a supplier was visited;
value for consumed items based on a table of values corresponding to items; and
value corresponding to an amount spent during a period of time.

17. The method of claim 1, further comprising reducing accrued earned value at the consumer account device based on a predetermined condition.

18. The method of claim 17, wherein the predetermined condition includes one or more of:
if a consumer of the account does not consume a predetermined amount of the consumable item; and
if a consumable item from another supplier is consumed.

19. The system of claim 9, wherein the accrued earned value is reduced based on a predetermined condition.

20. The system of claim 19, wherein the predetermined condition includes one of more of:
if a consumer of the account does not consume a predetermined amount of the consumable item; and
if a consumable item from another supplier is consumed.

* * * * *